UNITED STATES PATENT OFFICE.

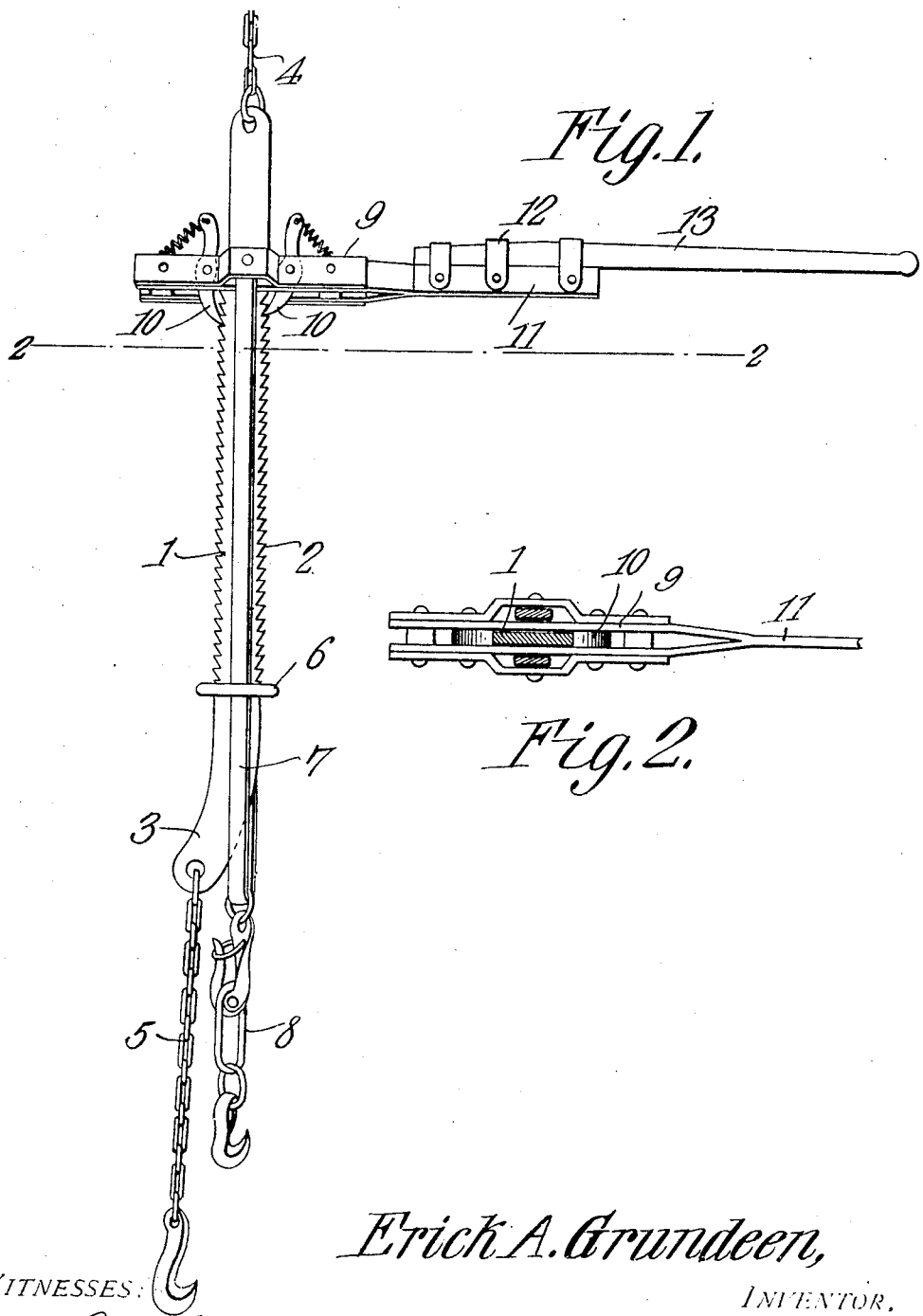

ERICK ALFRED GRUNDEEN, OF CARNEY, MICHIGAN.

STUMP-PULLER.

No. 875,808.   Specification of Letters Patent.   Patented Jan. 7, 1908.

Application filed February 18, 1907. Serial No. 357,985.

*To all whom it may concern:*

Be it known that I, ERICK A. GRUNDEEN, a citizen of the United States, residing at Carney, in the county of Menominee and State of Michigan, have invented a new and useful Stump-Puller, of which the following is a specification.

This invention has relation to stump pullers and it consists in the novel construction and arrangement of its parts as hereinafter shown and described.

The object of the invention is to provide a puller of the character indicated which may be easily and readily applied and manipulated for removing stumps and the like from the ground.

The implement consists primarily of a bar having upon its opposite edges ratchet teeth. A transversely disposed member is mounted upon said bar and is provided with pivotally mounted spring actuated pawls which engage the ratchet teeth of the bar. The said transversely disposed member is pivoted upon a strip which extends along the opposite sides of the said bar. Means is provided for guiding the said strip along the bar and the stump to be pulled is connected with said strip.

In the accompanying drawing:—Figure 1 is a side elevation of the stump puller, and Fig. 2 is a transverse sectional view of the same cut on the line 2—2 of Fig. 1.

The puller comprises the bar 1 which is provided upon its opposite edges with the ratchet teeth 2. Said bar is curved slightly to one side at one of its ends as at 3. The chain 4 is attached to one end of the bar 1 and the chain 5 is attached to the other end of the said bar. The ring 6 surrounds the bar 1. The strip 7 is bent at its middle and the ends of the said strip lie against or adjacent the opposite sides of the bar 3. The chain 8 is attached to the said strip 7. The transversely disposed member 9 is pivoted to the ends of the strip 7 and is provided with the pivoted spring actuated pawls 10 which engage the ratchet teeth 2. One end of the member 9 is provided with an extension 11 upon which is located the bands 12. The lever 13 is slipped in the said bands and is used for rocking the member 9 upon its pivots and bringing the ends of the spring actuated pawls 10 alternately in engagement with the ratchet teeth 2 thereby causing the said member 9 and the strip 7 to move longitudinally along the bar 1. As the bar 1 is held by means of the chain 4 to a fixed object and the strip 7 is attached by means of the chain 8 to the object to be moved it is obvious that as the said strip 7 is moved along the bar 1 that the object in tow will be moved correspondingly.

Having described my invention what I claim as new and desire to secure by Letters Patent is:—

A puller comprising a bar longitudinally curved at one end and having attaching means at both ends, a strip bent at its middle and having its end portion extending along the opposite sides of the bar, a cross member straddling the bar, clips attached to the outer sides of the cross member and having intermediate portions spaced therefrom, the ends of said strip being pivoted between the sides of the cross member and the clips, pawls pivoted to the cross member at opposite sides of the bar and having ends adapted to engage the edges of the bar, coil springs attached to the other end of said pawls and being connected with the cross member at points beyond the outer side of the pivots of the pawls and a ring surrounding the bar and strip and being retained upon the bar by the curved portion thereof.

In testimony that I claim the foregoing as my own, I have hereto affixed my signature in the presence of two witnesses.

ERICK ALFRED GRUNDEEN.

Witnesses:
 RUTH GARRIGAN,
 PETER GARRIGAN.